United States Patent
Boyle et al.

(10) Patent No.: US 7,852,596 B2
(45) Date of Patent: Dec. 14, 2010

(54) DISK DRIVE RETURNING DUMMY DATA TO A HOST WHEN READING AN UNWRITTEN DATA SECTOR

(75) Inventors: William B. Boyle, Lake Forest, CA (US); Chun Sei Tsai, Tustin, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 4 days.

(21) Appl. No.: 12/392,822

(22) Filed: Feb. 25, 2009

(65) Prior Publication Data

US 2010/0214682 A1  Aug. 26, 2010

(51) Int. Cl.
  *G11B 21/02* (2006.01)
  *G11B 5/09* (2006.01)
  *G11B 27/36* (2006.01)
(52) U.S. Cl. .......................... 360/75; 711/111; 711/165; 360/53; 360/51; 360/31; 360/55
(58) Field of Classification Search .................. None
  See application file for complete search history.

(56) References Cited

U.S. PATENT DOCUMENTS

| | | | |
|---|---|---|---|
| 5,664,096 | A | 9/1997 | Ichinomiya et al. |
| 5,729,396 | A | 3/1998 | Dudley et al. |
| 6,970,310 | B2 | 11/2005 | Kawaguchi et al. |
| 7,062,398 | B1 | 6/2006 | Rothberg |
| 2002/0036850 | A1 | 3/2002 | Lenny et al. |
| 2007/0079098 | A1* | 4/2007 | Kitamura ................. 711/170 |
| 2010/0017577 | A1* | 1/2010 | Fujimoto et al. ............ 711/165 |

OTHER PUBLICATIONS

U.S. Appl. No. 12/118,365 to Chun Sei Tsai, et al., filed May 9, 2008, 18 pages.

* cited by examiner

*Primary Examiner*—Andrew L Sniezek (57) ABSTRACT

A disk drive is disclosed comprising a disk and a head actuated over the disk. The disk comprises a plurality of tracks, wherein each track comprises a plurality of data sectors. A read command is received from a host to read data from a target data sector. When it is determined that the target data sector has not been written by the host, dummy data is returned to the host.

26 Claims, 7 Drawing Sheets

DISK DRIVE RETURNING DUMMY DATA TO A HOST WHEN READING AN UNWRITTEN DATA SECTOR

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Figure 1:
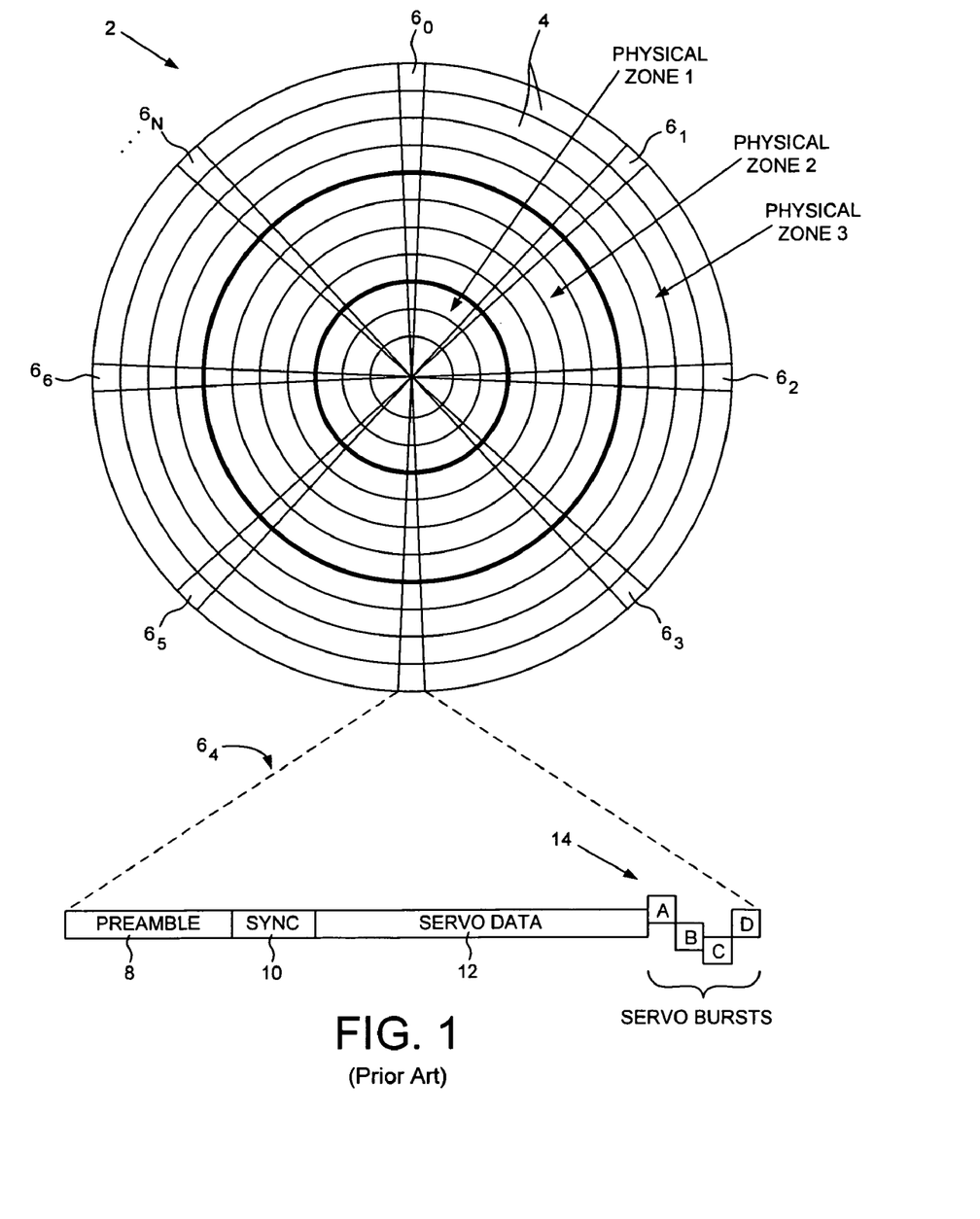
FIG. 1 shows a prior art disk format comprising a plurality of data tracks defined by embedded servo sectors.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of tracks 4, wherein the tracks are banded together in this example to form three physical zones from the inner diameter of the disk (ZONE 1) to the outer diameter of the disk (ZONE 3). The prior art disk format of FIG. 1 also comprises a number of servo sectors $6_0$-$6_N$ recorded around the circumference of each track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target track during a seek operation. Each servo sector $6_i$ further comprises groups of servo bursts 14 (e.g., A, B, C and D bursts), which comprise a number of consecutive transitions recorded at precise intervals and offsets with respect to a track centerline. The groups of servo bursts 14 provide fine head position information used for centerline tracking while accessing a track during write/read operations.

If during a read operation a data sector is unrecoverable (e.g., using an error correction code (ECC)), a read error is reported back to the host system. Ultimately, the disk drive may be considered defective and returned to the manufacturer for repair or replacement due to read errors reported to the host, which can be undesirable warranty cost for the disk drive manufacturer.

DETAILED DESCRIPTION OF EMBODIMENTS OF THE INVENTION

Figure 2A:
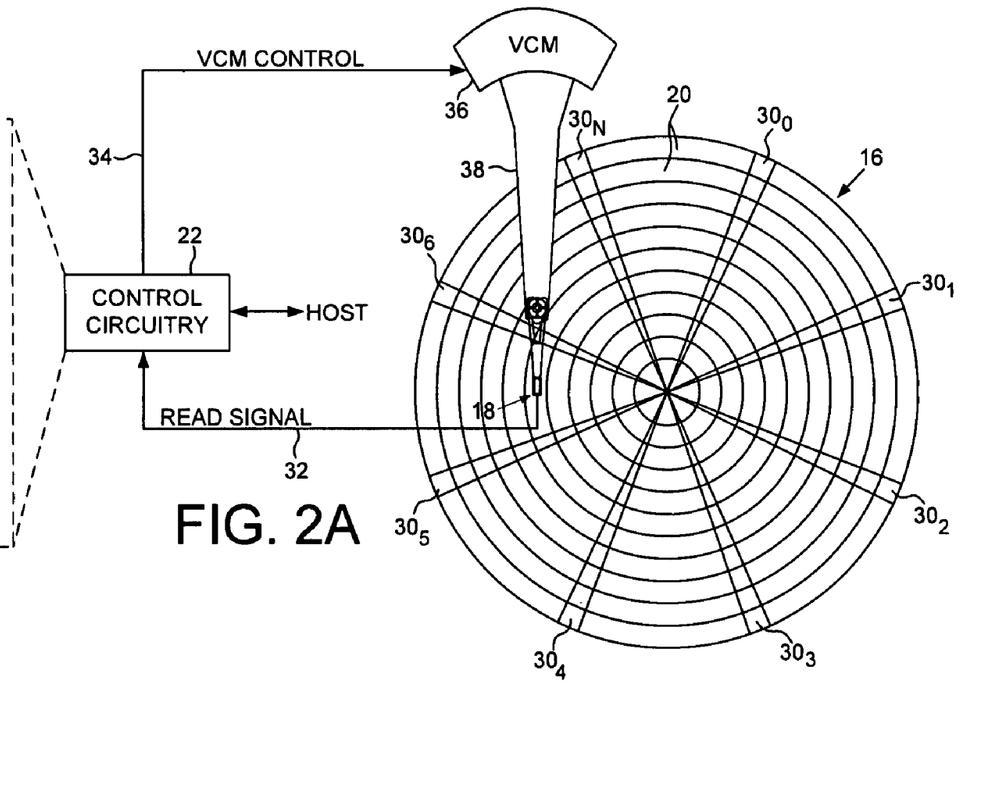
FIG. 2A shows a disk drive according to an embodiment of the present invention comprising a disk, a head actuated over the disk, and control circuitry.
Figure 2B:
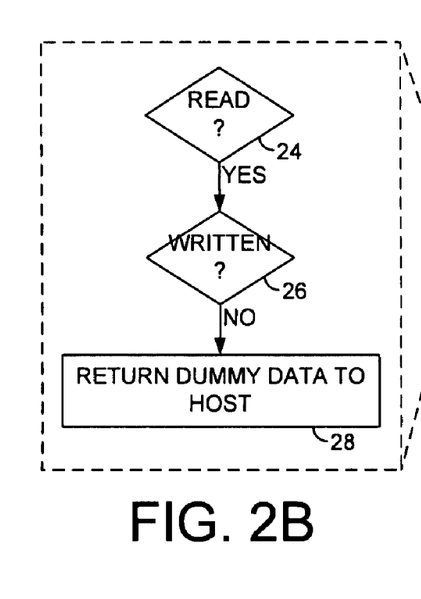
FIG. 2B is a flow diagram executed by the control circuitry according to an embodiment of the present invention wherein if a read command is received from a host to read a target data sector, and it is determined that the target data sector has not been written by the host, dummy data is returned to the host.

FIG. 2A shows a disk drive according to an embodiment of the present invention comprising a disk 16 and a head 18 actuated over the disk. The disk 16 comprises a plurality of tracks 20, wherein each track comprises a plurality of data sectors. The disk drive further comprises control circuitry 22 for executing the flow diagram of FIG. 2B, wherein a read command is received from a host to read data from a target data sector (step 24). When the target data sector has not been written by the host (step 26), dummy data is returned to the host (step 28).

Figure 3A:
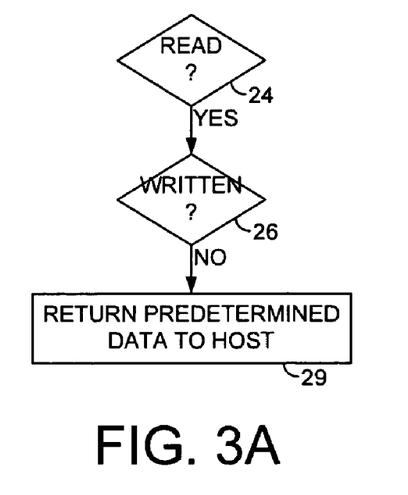
FIG. 3A is a flow diagram according to an embodiment of the present invention wherein the dummy data returned to the host comprises predetermined data.

The dummy data returned to the host when a data sector has not been written by the host may comprise any suitable data. In an embodiment shown in FIG. 3A the dummy data returned to the host comprises predetermined data (step 29). The predetermined data may comprise any suitable data, and in one embodiment the predetermined data comprises manufacturing data written to the data sectors during a manufacturing process. In one embodiment, all of the data sectors are erased during a manufacturing process, and therefore the predetermined data returned to the host comprises a plurality of zero bits. In another embodiment, the dummy data may comprise random data, and in another embodiment, the dummy data may comprise uncorrected data read from an unrecoverable data sector.

Figure 3B:
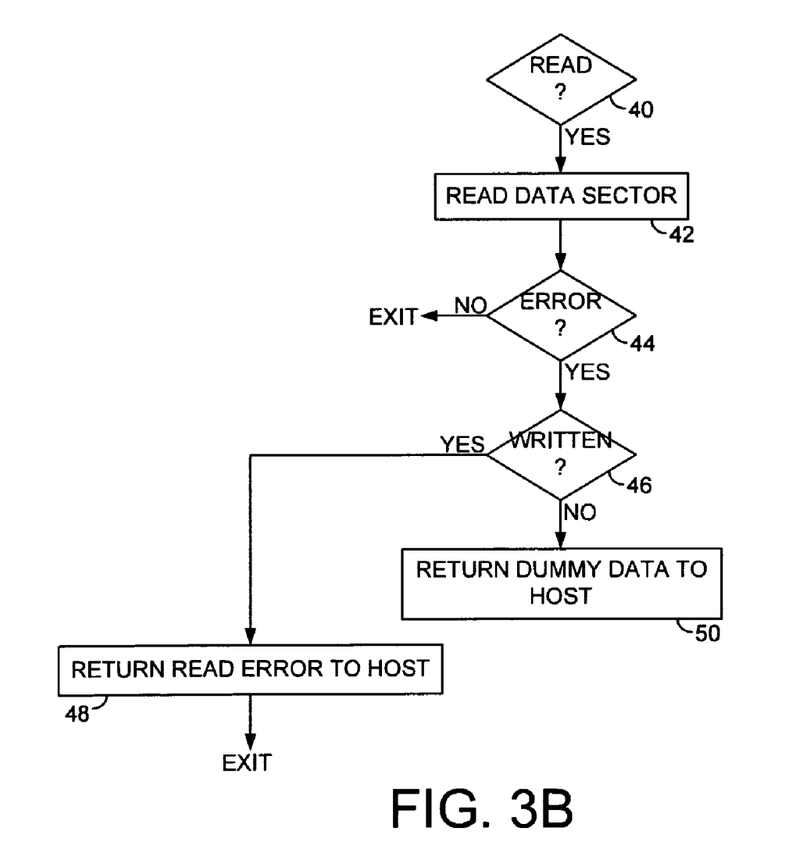
FIG. 3B is a flow diagram according to an embodiment of the present invention wherein if the target data sector has been written by the host but is unrecoverable, an error message is returned to the host whereas dummy data is returned to the host if the target data sector has not been written by the host.

FIG. 3B is a flow diagram according to an embodiment wherein when a read command is received from the host (step 40) to read data from a data sector, the control circuitry 22 attempts to read (step 42) the data sector (e.g., read the manufacturing data from the data sector). If the data sector is successfully read (step 44), the data read from the data sector is returned to the host. If the data sector is unrecoverable (step 44) and the data sector has been written by the host (step 46), the control circuitry 22 returns an error to the host (step 48). However if the data sector has not been written by the host (step 46), the control circuitry 22 returns dummy data to the host (step 50). This reduces the number of disk drives returned to the manufacturer as defective since the disk drive is able to return data to the host rather than an error message indicating that a data sector is unrecoverable. In one embodiment, when a read command is received to read data from a data sector that has not yet been written, the control circuitry 22 returns dummy data without attempting to read the data sector.

In the embodiment of FIG. 2A, the disk 16 comprises a plurality of servo sectors $30_0$-$30_N$ that define the plurality of tracks 20. The control circuitry 22 processes the read signal 32 to demodulate the servo sectors $30_0$-$30_N$ into a position error signal (PES). The PES is filtered with a suitable compensation filter to generate a control signal 34 applied to a voice coil motor (VCM) 36 which rotates an actuator arm 38 about a pivot in order to position the head 18 radially over the disk 16 in a direction that reduces the PES. The servo sectors $30_0$-$30_N$ may comprise any suitable position information, such as a track address for coarse positioning and servo bursts for fine positioning.

Figure 3C:
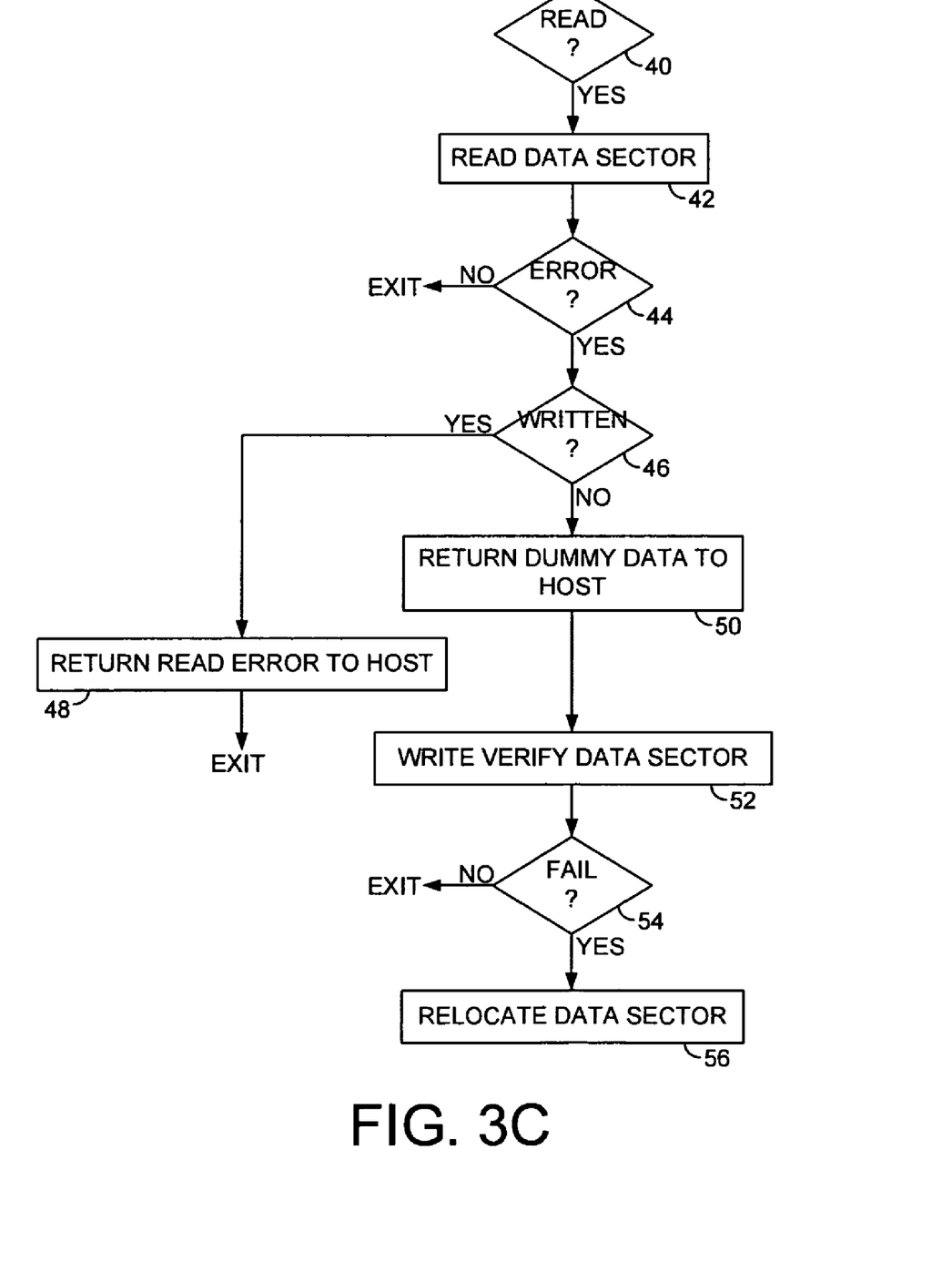
FIG. 3C is a flow diagram according to an embodiment of the present invention wherein if an error occurs while attempting to read an unwritten data sector, the data sector is write verified, and if the write verify fails, the data sector is relocated to a spare sector.

FIG. 3C shows a flow diagram according to an embodiment of the present invention which extends on the flow diagram of FIG. 3B, wherein when an unrecoverable data sector has not been written by the host, the data sector is write verified (step 52) by writing a data pattern to the target data sector and attempting to reread the target data sector. In one embodiment, the data pattern written during the write verify (step 52) comprises manufacturing data (e.g., zero bits). If the write verify fails (step 54), then the target data sector is relocated to a spare data sector (step 56). In this manner, defective data sectors may be detected and relocated to spare data sectors before the host actually performs a write operation to the target data sector. In one embodiment, an unrecoverable data sector may be relocated (step 56) without performing a write verify operation on the data sector.

Figure 4A:
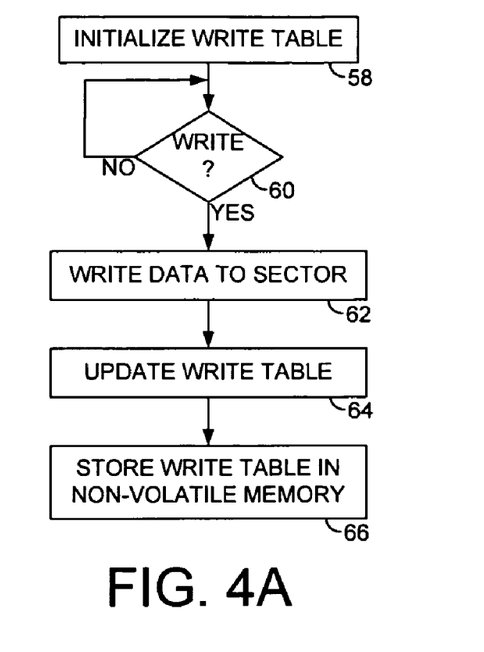
FIG. 4A is a flow diagram according to an embodiment of the present invention wherein a write table is updated after writing data to a data sector.

FIG. 4A is a flow diagram according to an embodiment of the present invention wherein a write table is initialized (step 58), for example, by initially marking all of the data sectors as unwritten. When a write command is received from the host (step 60), data is written to at least one data sector (step 62) and the corresponding entry in the write table is updated with a status of "written" (step 64). The write table is stored in a non-volatile memory (step 66), such as on the disk 16, or in a non-volatile semiconductor memory (e.g., a Flash memory). When the disk drive is powered on, the write table is read from the non-volatile memory and updated as new write commands are received from the host.

Figure 4B:
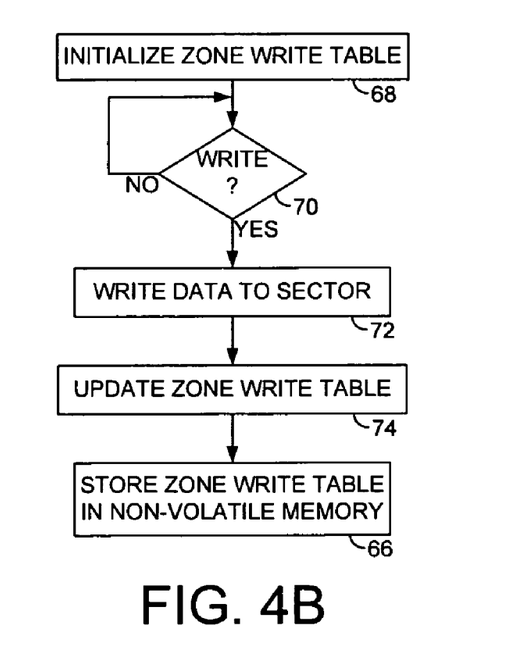
FIG. 4B is a flow diagram according to an embodiment of the present invention wherein a zone write table is updated after writing data to a data sector.

The write table may be implemented in any suitable manner, and in one embodiment, the write table comprises an entry for each data sector on the disk 16. In an alternative embodiment shown in the flow diagram of FIG. 4B, the write table identifies a number of zones on the disk 16, wherein each zone identifies a plurality of the data sectors. The zone write table is initialized (step 68), for example, by initially marking all of the zones as unwritten. When a write command is received from the host (step 70), data is written to at least one data sector (step 72) and the corresponding zone within the write table is updated with a status of "written" (step 74). When a zone is updated as "written", all of the data sectors identified by the zone are assigned a "written" status even if some of the data sectors have not actually been written. This embodiment may reduce the management overhead and storage requirements by reducing the number of entries in the write table.

Figure 5A:
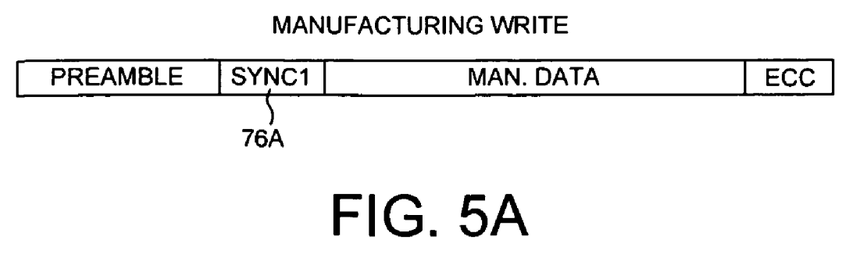
FIGS. 5A and 5B show an embodiment of the present invention wherein a first sync mark is written to a data sector during a manufacturing process, and a second sync mark is written to the data sector during normal operation while the disk drive is in-the-field.
Figure 5B:
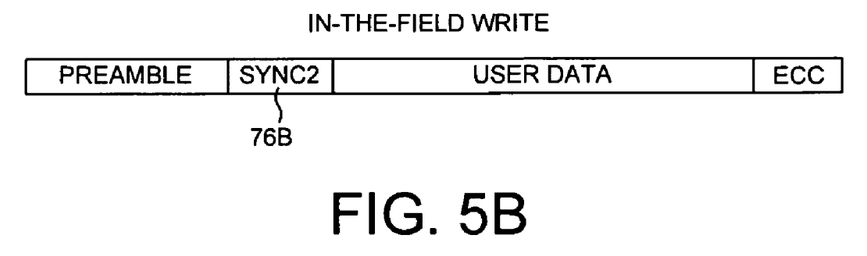

FIGS. 5A and 5B illustrate an embodiment of the present invention wherein instead of using a write table to identify unwritten data sectors, the data sectors are written with first and second sync marks 76A and 76B. When writing to a data sector during manufacturing, a first sync mark 76A is written to the data sector, and when writing to the same data sector in response to a host command while in-the-field, a second sync mark 76B is written to the data sector. In this manner, when a read command is received from the host to read data from a target data sector, whether the target data sector has been previously written by the host can be determined by evaluating which sync mark is detected. That is, if the first sync mark 76A is detected, the target data sector is considered unwritten, and if the second sync mark 76B is detected, the target data sector is considered written.

Figure 6A:
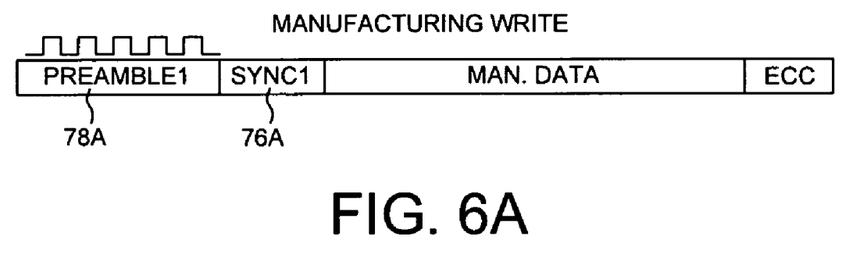
FIGS. 6A and 6B show an embodiment of the present invention wherein a first preamble having a first phase is written preceding the first sync mark during a manufacturing process, and a second preamble having a second phase is written preceding the second sync mark during normal operation while the disk drive is in-the-field.
Figure 6B:
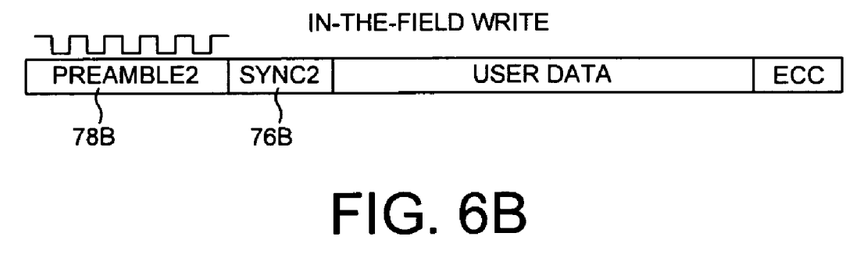

FIGS. 6A and 6B illustrate an embodiment of the present invention wherein the preamble of a data sector is used to increase the reliability of differentiating between the first sync mark 76A and the second sync mark 76B. In this embodiment, a first preamble 78A is written to the data sector preceding the first sync mark 76A during manufacturing, and a second preamble 78B is written to the data sector preceding the second sync mark 76B while in-the-field, wherein the first preamble 78A ends with a phase (e.g., "+ +" or "− −") that is different from the phase (e.g., "+ −" or "− +") of the second preamble 78B. In this manner, the second sync mark 76B will be considered accurately detected (and the target data sector considered written by the host) only if the preamble of the target data sector ends in the correct phase (i.e., only if the second preamble 78B is detected).

Figure 7A:
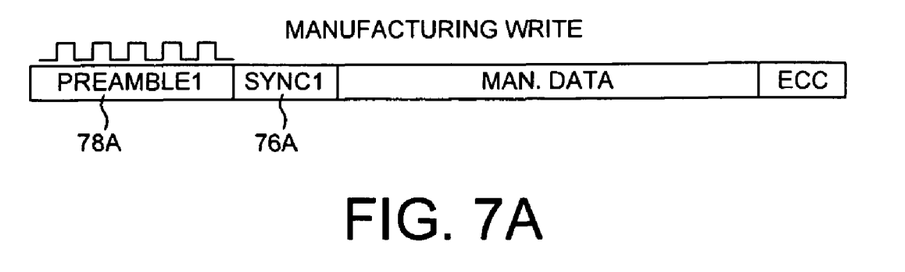
FIGS. 7A and 7B show an embodiment of the present invention wherein a first preamble having a first phase is written preceding a first sync mark during a manufacturing process, and a second preamble having a second phase is written preceding the first sync mark during normal operation while the disk drive is in-the-field.
Figure 7B:
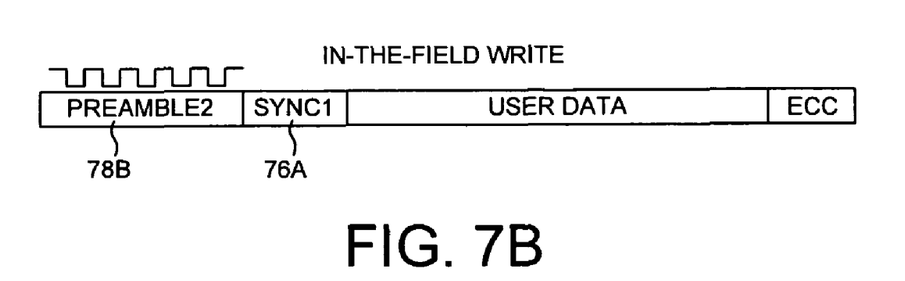

FIGS. 7A and 7B illustrate an embodiment of the present invention wherein the same sync mark 76A may be written during manufacturing and while in-the-field. However, a first preamble 78A ending with a first phase is written during manufacturing, and a second preamble 78B ending with a second phase is written while in-the-field. In this embodiment, a data sector will be considered unwritten by the host if the first preamble 78A is detected, and written by the host if the second preamble 78B is detected. The preamble that is detected can be determined by evaluating the read signal samples of the preamble (e.g., the last two samples of the preamble) after detecting the sync mark.

In the embodiments of the present invention, the host may comprise any suitable entity, such as a personal computer (PC) manufacturer, or an original equipment manufacture (OEM). In another embodiment, the host is implemented virtually within each disk drive (in firmware), wherein an example of this embodiment is disclosed in U.S. Pat. No. 7,062,398 the disclosure of which is incorporated herein by reference.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of tracks, wherein each track comprises a plurality of data sectors;
   a head actuated over the disk; and
   control circuitry operable to:
      receive a read command from a host to read data from a target data sector;
      determine whether the target data sector has been written in response to a write command received from the host; and
      when the target data sector has not been written in response to the write command, return dummy data to the host,
   wherein:
      when the target data sector has been written in response to the write command, the control circuitry is further operable to return an error message to the host when the target data sector is unrecoverable; and
      when the target data sector has not been written in response to the write command, the control circuitry is further operable to return the dummy data to the host when the target data sector is unrecoverable.

2. The disk drive as recited in claim 1, wherein the dummy data comprises predetermined data.

3. The disk drive as recited in claim 2, wherein the predetermined data comprises a plurality of zero bits.

4. The disk drive as recited in claim 1, wherein the dummy data comprises data read from the target data sector.

5. The disk drive as recited in claim 1, wherein when the target data sector has not been written in response to the write command, the control circuitry is further operable to write verify the target data sector when the target data sector is unrecoverable.

6. The disk drive as recited in claim 1, wherein when the target data sector has not been written in response to the write command, the control circuitry is further operable to relocate the target data sector to a spare sector when the target data sector is unrecoverable.

7. The disk drive as recited in claim 1, wherein the control circuitry is further operable to:
   receive the write command from the host to write user data to the target data sector; and
   update a write table to reflect that the target data sector has been written in response to the write command.

8. The disk drive as recited in claim 7, wherein:
   the write table comprises a plurality of entries, wherein each entry identifies a zone corresponding to a plurality of data sectors; and
   the control circuitry is operable to update an entry in the write table corresponding to the target data sector when the control circuitry writes data to any data sector in the zone comprising the target data sector.

9. The disk drive as recited in claim 1, wherein the control circuitry is further operable to:
   write manufacturing data and a first sync mark to the target data sector during a manufacturing process;
   receive the write command from the host to write user data to the target data sector, and in response to the write command write the user data and a second sync mark to the target data sector, wherein the second sync mark is different from the first sync mark; and
   determining that the target data sector has been written in response to the write command by detecting the second sync mark.

10. The disk drive as recited in claim 9, wherein the control circuitry is further operable to:
    write a first preamble preceding the first sync mark to the target data sector during the manufacturing process, wherein the first preamble ends with a first phase; and
    in response to the write command received from the host, write a second preamble preceding the second sync mark to the target data sector, wherein the second preamble ends with a second phase different than the first phase.

11. The disk drive as recited in claim 1, wherein the control circuitry is further operable to:
    write a first preamble and a first sync mark to the target data sector during a manufacturing process, wherein the first preamble ends with a first phase;
    in response to the write command received from the host, write a second preamble and the first sync mark to the target data sector, wherein the second preamble ends with a second phase different than the first phase; and
    determine that the target data sector has been written in response to the write command detecting the second preamble and the first sync mark.

12. A method of operating a disk drive, the disk drive comprising a disk and a head actuated over the disk, wherein the disk comprises a plurality of tracks and each track comprises a plurality of data sectors, the method comprising:
    receiving a read command from a host to read data from a target data sector;
    determining whether the target data sector has been written in response to a write command received from the host; and
    when the target data sector has not been written in response to the write command, returning dummy data to the host,
    wherein:
       when the target data sector has been written in response to the write command, further comprising returning an error message to the host when the target data sector is unrecoverable; and
       when the target data sector has not been written in response to the write command, further comprising returning the dummy data to the host when the target data sector is unrecoverable.

13. The method as recited in claim 12, wherein the dummy data comprises predetermined data.

14. The method as recited in claim 13, wherein the predetermined data comprises a plurality of zero bits.

15. The method as recited in claim 12, wherein the dummy data comprises data read from the target data sector.

16. The method as recited in claim 12, wherein when the target data sector has not been written in response to the write command, further comprising write verifying the target data sector when the target data sector is unrecoverable.

17. The method as recited in claim 12, wherein when the target data sector has not been written in response to the write command, further comprising relocating the target data sector to a spare sector when the target data sector is unrecoverable.

18. The method as recited in claim 12, further comprising:
receiving the write command from the host to write user data to the target data sector; and
updating a write table to reflect that the target data sector has been written in response to the write command.

19. The method as recited in claim 18, wherein:
the write table comprises a plurality of entries, wherein each entry identifies a zone corresponding to a plurality of data sectors; and
updating the write table comprises updating an entry in the write table corresponding to the target data sector when data is written to any data sector in the zone comprising the target data sector.

20. The method as recited in claim 12, further comprising:
writing manufacturing data and a first sync mark to the target data sector during a manufacturing process;
receiving the write command from the host to write user data to the target data sector, and in response to the write command writing the user data and a second sync mark to the target data sector, wherein the second sync mark is different from the first sync mark; and
determining that the target data sector has been written in response to the write command by detecting the second sync mark.

21. The method as recited in claim 20, further comprising:
writing a first preamble preceding the first sync mark to the target data sector during the manufacturing process, wherein the first preamble ends with a first phase; and
in response to the write command received from the host, writing a second preamble preceding the second sync mark to the target data sector, wherein the second preamble ends with a second phase different than the first phase.

22. The method as recited in claim 12, further comprising:
writing a first preamble and a first sync mark to the target data sector during a manufacturing process, wherein the first preamble ends with a first phase;
in response to the write command received from the host, writing a second preamble and the first sync mark to the target data sector, wherein the second preamble ends with a second phase different than the first phase; and
determining that the target data sector has been written in response to the write command by detecting the second preamble and the first sync mark.

23. A disk drive comprising:
a disk comprising a plurality of tracks, wherein each track comprises a plurality of data sectors;
a head actuated over the disk; and
control circuitry operable to:
receive a read command from a host to read data from a target data sector;
determine whether the target data sector has been written in response to a write command received from the host;
when the target data sector has not been written in response to the write command, return dummy data to the host;
write manufacturing data and a first sync mark to the target data sector during a manufacturing process;
receive the write command from the host to write user data to the target data sector, and in response to the write command write the user data and a second sync mark to the target data sector, wherein the second sync mark is different from the first sync mark; and
determining that the target data sector has been written in response to the write command by detecting the second sync mark.

24. A disk drive comprising:
a disk comprising a plurality of tracks, wherein each track comprises a plurality of data sectors;
a head actuated over the disk; and
control circuitry operable to:
receive a read command from a host to read data from a target data sector;
determine whether the target data sector has been written in response to a write command received from the host;
when the target data sector has not been written in response to the write command, return dummy data to the host;
write a first preamble and a first sync mark to the target data sector during a manufacturing process, wherein the first preamble ends with a first phase;
in response to the write command received from the host, write a second preamble and the first sync mark to the target data sector, wherein the second preamble ends with a second phase different than the first phase; and
determine that the target data sector has been written in response to the write command by detecting the second preamble and the first sync mark.

25. A method of operating a disk drive, the disk drive comprising a disk and a head actuated over the disk, wherein the disk comprises a plurality of tracks and each track comprises a plurality of data sectors, the method comprising:
receiving a read command from a host to read data from a target data sector;
determining whether the target data sector has been written in response to a write command received from the host;
when the target data sector has not been written in response to the write command, returning dummy data to the host;
writing manufacturing data and a first sync mark to the target data sector during a manufacturing process;
receiving the write command from the host to write user data to the target data sector, and in response to the write command writing the user data and a second sync mark to the target data sector, wherein the second sync mark is different from the first sync mark; and
determining that the target data sector has been written in response to the write command by detecting the second sync mark.

26. A method of operating a disk drive, the disk drive comprising a disk and a head actuated over the disk, wherein the disk comprises a plurality of tracks and each track comprises a plurality of data sectors, the method comprising:

receiving a read command from a host to read data from a target data sector;

determining whether the target data sector has been written in response to a write command received from the host;

when the target data sector has not been written in response to the write command, returning dummy data to the host;

writing a first preamble and a first sync mark to the target data sector during a manufacturing process, wherein the first preamble ends with a first phase;

in response to the write command received from the host, writing a second preamble and the first sync mark to the target data sector, wherein the second preamble ends with a second phase different than the first phase; and determining that the target data sector has been written in response to the write command by detecting the second preamble and the first sync mark.

* * * * *